United States Patent
Marlin

(10) Patent No.: US 10,035,489 B2
(45) Date of Patent: Jul. 31, 2018

(54) PYROTECHNIC CHARGE AND GAS GENERATOR COMPRISING SUCH A CHARGE

(71) Applicant: HERAKLES, Le Haillan (FR)

(72) Inventor: Frédéric Marlin, Saint Medard en Jalles (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 14/896,089

(22) PCT Filed: Jun. 5, 2014

(86) PCT No.: PCT/FR2014/051355
§ 371 (c)(1),
(2) Date: Dec. 4, 2015

(87) PCT Pub. No.: WO2014/195650
PCT Pub. Date: Dec. 11, 2014

(65) Prior Publication Data
US 2016/0131460 A1    May 12, 2016

(30) Foreign Application Priority Data

Jun. 6, 2013 (FR) ..................... 13 55202

(51) Int. Cl.
*B60R 21/264* (2006.01)
*F42B 3/04* (2006.01)
(Continued)

(52) U.S. Cl.
CPC ........ *B60R 21/2644* (2013.01); *B60R 21/264* (2013.01); *F42B 3/04* (2013.01);
(Continued)

(58) Field of Classification Search
CPC .... F42B 3/04; F42B 5/16; F42B 30/12; B60R 21/2644; B60R 2021/26029; B60R 21/26; B60R 21/264
(Continued)

(56) References Cited

U.S. PATENT DOCUMENTS 4,094,248 A    6/1978 Jacobson
4,276,065 A    6/1981 Miko et al.
(Continued)

FOREIGN PATENT DOCUMENTS

EP    0 630 783 A1    12/1994
EP    0 822 384 A2    2/1998
(Continued)

OTHER PUBLICATIONS

International Search Report as issued in International Patent Application No. PCT/FR2014/051355, dated Aug. 27, 2014.

*Primary Examiner* — James S Bergin
(74) *Attorney, Agent, or Firm* — Pillsbury Winthrop Shaw Pittman LLP

(57) ABSTRACT

A pyrotechnic charge for a pyrotechnic gas generator includes a plurality of blocks made of pyrotechnic material stacked in layers, each block being defined by two main faces that are substantially orthogonal to the stacking direction. In this pyrotechnic charge, each layer of the stack includes at least two distinct blocks of pyrotechnic material, each forming an angular sector of a ring or of a disk, the blocks being assembled together to form a ring and/or a disk.

15 Claims, 6 Drawing Sheets

(51) Int. Cl.
*F42B 5/16* (2006.01)
*F42B 30/12* (2006.01)
*B60R 21/26* (2011.01)

(52) U.S. Cl.
CPC ............... *F42B 5/16* (2013.01); *F42B 30/12* (2013.01); *B60R 2021/26029* (2013.01)

(58) Field of Classification Search
USPC ........ 102/530, 285, 288, 292, 531; 280/736, 280/741
See application file for complete search history.

(56) References Cited

U.S. PATENT DOCUMENTS

| | | | |
|---|---|---|---|
| 4,846,368 A | | 7/1989 | Goetz |
| 5,712,445 A | * | 1/1998 | Kassuelke ............ C06B 21/0033 102/288 |
| 6,077,372 A | * | 6/2000 | Mendenhall ......... C06B 21/0083 149/109.6 |
| 9,051,223 B2 | * | 6/2015 | Cox .......................... C06B 21/00 |
| 2009/0315307 A1 | | 12/2009 | Neumayer et al. |
| 2010/0236443 A1 | * | 9/2010 | Haskins ................ F42B 12/207 102/478 |

FOREIGN PATENT DOCUMENTS

| | | |
|---|---|---|
| EP | 2 233 879 A2 | 9/2010 |
| FR | 2 489 419 | 3/1982 |

* cited by examiner

PYROTECHNIC CHARGE AND GAS GENERATOR COMPRISING SUCH A CHARGE

CROSS-REFERENCE TO RELATED APPLICATIONS

This application is the U.S. National Stage of PCT/FR2014/051355, filed Jun. 5, 2014, which in turn claims priority to French patent application number 1355202 filed Jun. 6, 2013. The content of these applications are incorporated herein by reference in their entireties.

The invention relates to a pyrotechnic charge.

In particular, it relates to a pyrotechnic charge adapted to be incorporated in a pyrotechnic gas generator, and to a pyrotechnic gas generator including such a charge.

More specially, the present invention relates to a pyrotechnic charge comprising a plurality of blocks of pyrotechnic material, in particular of solid propellant that are stacked in layers.

In particular in the field of gas generators for airbags, it is known to use compression to make propellant blocks that are generally cylindrical or egg-shaped and to arrange them in bulk in a combustion chamber of a pyrotechnic gas generator in order to form a charge. Patent application US 2009/315307 describes an example of such a charge.

The drawback of that type of charge is that the packing ratio of the combustion chamber by the charge is relatively low, being of the order of 50% at most. The size of the combustion chamber for a given volume of charge is thus large.

The ballistic behavior of a "bulk" charge of low density can also be unsuitable for certain pyrotechnic compositions and for certain applications. In particular, for compositions that decompose by pyrolysis (by transfer of a decomposition front controlled by contacts between blocks), having a charge of low density can lead to combustion that is incomplete, and even to combustion that suffers premature extinction.

In addition, in a "bulk" charge, friction, e.g. due to vibration of the system in which it is installed, takes place via the almost point contacts between the various pyrotechnic blocks, and can lead to damage of the charge, in particular if the number of blocks is high and the charge is of considerable weight.

Finally, when a combustion chamber containing a bulk charge presents a low packing ratio, i.e. when the empty space inside the combustion chamber is large, it can be necessary to overdimension the ignition charge of the gas generator in order to be able to pressurize the empty volume, in particular when the pyrotechnic blocks constituting the charge generate less energetic gas at low temperature, and that consequently do not enable combustion to propagate within the charge as effectively as would hot gas.

Charges constituted by a stack of disks are also known, in particular from patent EP 0 630 783. They serve to enhance transfers of heat because of their increased density. Nevertheless, it remains difficult to fabricate blocks that are disk-shaped, and such fabrication requires tooling that is expensive, bulky, and not suitable for high rates of fabrication throughout.

An object of the present invention is to provide a pyrotechnic charge enabling the above-mentioned problems to be resolved.

This object is achieved with a pyrotechnic charge for a pyrotechnic gas generator, the charge comprising a plurality of blocks made of pyrotechnic material stacked in layers, each block being defined by two main faces that are substantially orthogonal to the stacking direction, said pyrotechnic charge being characterized in that each layer of the stack comprises at least two distinct blocks of pyrotechnic material, each forming an angular sector of a ring or of a disk, said blocks being assembled together to form a ring and/or a disk.

The pyrotechnic charge of the invention makes it possible to optimize the packing ratio of the combustion chamber of a pyrotechnic gas generator.

Furthermore, the shape of the charge makes large contact areas available between blocks and that leads to good transfer of heat by conduction.

The small dimensions of each unit block making up the charge serves to retain a relatively large combustion area that can be adapted easily.

Finally, the limited dimensions of the blocks make them easier to compress. For charges of large diameter in particular, subdivision into sectors makes it possible to limit the compression forces that are needed during fabrication, thus making it possible to use compression tooling of relatively small dimensions, and to increase production rates.

In the present description, and unless specified to the contrary, an axial direction is a direction parallel to the axis of the stack.

Generally, the stacking axis is the axis of the ring(s) and the disk(s) formed by the blocks of the stack.

In addition, a radial direction is a direction perpendicular to the stacking axis and intersecting said axis. Unless specified to the contrary, the adjectives and adverbs "axial", "radial", "axially", and "radially", are used with reference to the above-mentioned axial and radial directions. In the same manner, an axial plane is a plane containing the stacking axis and a radial plane is a plane perpendicular to that axis. Likewise, an axial section is a section defined in an axial plane, and a radial section is a section defined in a radial plane.

The main faces of the blocks of the stack are substantially orthogonal to the stacking direction. In certain embodiments, they may be rounded, and/or they may slope a little relative to the stacking axis.

In general, each block has a radially outside face that is curved, e.g. in the form of a circular arc (in particular to match the shape of the casing containing the charge), and at least one junction face of a shape that is adapted to co-operate with the corresponding face of a junction face of an adjacent block.

With the main faces substantially perpendicular to the stacking axis, the lateral faces of a block, and in particular its radially outside face and its junction face(s) are generally orthogonal to said main faces.

In the present description, the term "angular sector" of a ring or a disk is used to mean a ring or disk portion that is not necessarily limited on both sides by axial planes. The junction faces are thus not necessarily plane in shape, and they do not necessarily extend in axial planes. The blocks of a given layer are nevertheless of shapes that are suitable for co-operating with one another so as to reconstitute a ring or a disk, once they have been assembled together.

Nevertheless, in a preferred provision of the invention, a junction face is plane or substantially plane. In still more preferred manner, it is defined by a plane containing the axis of the ring or the disk of which the block including it forms an angular sector.

In an advantageous provision of the invention, at least one block of each layer presents at least one truncated corner.

The term "corner" is used of a block to mean a vertex formed by two adjacent lateral faces of the block and extending from one main face of the block to the other. The corner is generally truncated over its full height, from one main face to the other main face of the block.

The truncated corners of blocks form channels for allowing gas to flow between the blocks, thereby enabling all of the charge to be ignited almost simultaneously and enabling the gas stream to be drained from inside the charge. By means of these provisions, good ignition and effective combustion of the charge are ensured, even for compositions that present a low combustion temperature, e.g. of the order of 1000 K to 1100 K, and/or a low combustion speed.

A truncated corner of a block of the stack may in particular be chamfered or rounded. In a given layer of the stack, and even within a given block, certain corners may be rounded while others are chamfered. In any event, certain corners may also not be truncated. Nevertheless, in a preferred configuration, each corner of each block is truncated.

In an example, each layer of the stack comprises at least three distinct blocks, each forming an angular sector of a ring and arranged together to form a ring. In a preferred configuration, these blocks form angular sectors all occupying the same angle.

In an example, each layer of the stack comprises two distinct blocks, each forming an angular sector of a disk and arranged together to form a disk. In a preferred configuration, said at least two blocks form angular sectors of a disk, each occupying the same angle.

In an example, at least one layer of the stack, and preferably each layer of the stack, comprises a central disk of pyrotechnic material together with at least two distinct blocks, preferably at least three distinct blocks, each forming an angular sector of a ring and arranged to form a ring that is coaxial around said central disk.

In an example, the central disk is formed by at least two distinct blocks, each forming an angular sector of a disk.

In an element, at least one block presents a groove in one of its main faces. Such a rib serves to space two blocks of two adjacent layers axially apart from each other, thereby creating a flow channel for gas inside the charge.

In an example, at least one block presents a rib on one of its main faces, said groove extending from one edge to an opposite edge of said face. Such a groove forms a flow channel for gas inside the charge.

In an example, at least one block of the stack presents a notch in one of its lateral faces, in particular in its radially outside face.

In an example, at least one block of the stack includes a through hole opening out into both of its main faces.

In an example, at least one block of each layer of the stack includes an opening, said opening being in alignment with an opening of a block in each other layer of the stack, so as to form a channel extending from end to end of the stack.

In an example, the opening is a notch formed in one of the lateral faces of the block, in particular its radially outside surface, said notch being in alignment with a notch of a block in each other layer of the stack so as to form a channel extending from one end of the stack to the other.

In an example, the opening is a positioning hole passing right through the block and opening out into its two main faces, said positioning hole being in alignment with a positioning hole of a block in each other layer of the stack so as to form a channel passing right through the stack and adapted to receive a retaining pin. A retaining pin makes it possible by co-operating with the various layers of the stack to adjust the relative positioning of the pyrotechnic blocks in the various layers in optimum manner, prior to inserting the charge into a combustion chamber, or at the time of said insertion.

The invention also provides a pyrotechnic gas generator comprising a body housing a charge as defined above, together with an ignition system adapted to initiate combustion of said charge.

The body of the generator defines a combustion chamber.

In an example, the body is in form of a right cylinder, and the stack is dimensioned so that its outside face is flush with the inside face of said body. It can be understood that the axis of the body thus substantially coincides with the axis of the stack. These provisions make it possible to optimize filling of the combustion chamber with a limited number of angular sectors, while conserving the advantages associated with sectorizing the layers of the stack.

Thus, by way of example, each layer of the stack comprises a ring formed by assembling together at least two distinct blocks, each forming an angular sector of a ring, the body presenting the shape of a right cylinder, and the outside radius of the ring is substantially equal to the inside radius of the body.

In a configuration in which each layer of the stack further includes a central disk made of pyrotechnic material, the radius of the central disk is preferably substantially equal to the inside radius of the ring surrounding it.

In an example, at least one block of each layer of the stack constituting the charge includes an opening, said opening being in alignment with an opening of a block of each other layer of the stack so as to form a channel extending right through the stack, and the body includes positioning means adapted to co-operate with said channel.

In an example, the opening is a notch formed in one of the side faces of the block, said notch being in alignment with a notch in a block of each other layer of the stack, thereby forming a channel extending from end to end of the stack, and the positioning means comprise a positioning rib formed on the inside face of the body and adapted to co-operate with said channel.

In an example, the opening is a positioning hole passing right through the block, opening out into its two main faces, said positioning hole being in alignment with a positioning hole in a block of each other layer of the stack so as to form a channel passing right through the stack, and the gas generator also includes at least one retaining pin adapted to pass through said channel in order to hold the layers of the stack in position. The retaining pin may be used to facilitate putting the charge into place inside the combustion chamber during assembly. Under such circumstances, it may optionally be removable. In addition, or in another example, the retaining pin may also be used for keeping the charge in an optimum position inside the combustion chamber after assembly.

A pyrotechnic charge and a pyrotechnic gas generator as described above can be used in numerous different applications, and particularly, but in non-limiting manner, for inflating a car airbag or for igniting a thruster, or for propelling a munition.

Several implementations or embodiments are described in the present description. Nevertheless, unless specified to the contrary, the characteristics described with any one implementation or embodiment may be applied to any other implementation or embodiment.

The invention can be better understood and other advantages thereof appear more clearly in the light of the following description given purely by way of example and made with reference to the accompanying drawings, in which.

Figure 1A:
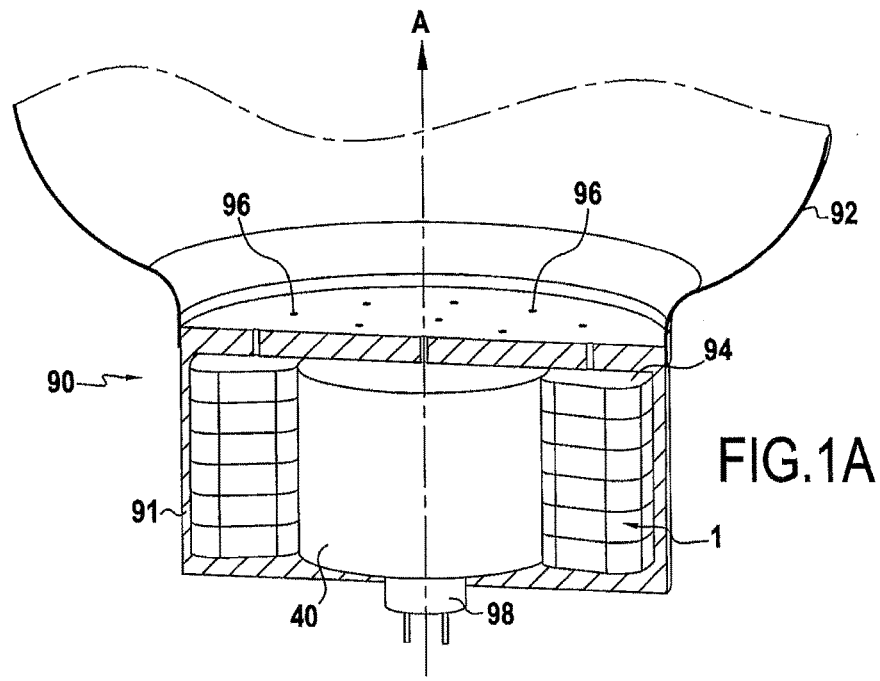
FIG. 1A shows a gas generator housing a pyrotechnic charge in a first embodiment of the invention.

FIG. 1A shows a pyrotechnic gas generator 90 for inflating a car airbag 92. The gas generator 90 has a combustion chamber 94 that communicates with the inside of the airbag 92 via a plurality of orifices 96 constituting a gas flow passage.

The combustion chamber 94 is defined by a body 91 in the form of a right cylinder of axis A.

It houses an ignition system 98 and a pyrotechnic charge 1 constituting a first embodiment of the invention and suitable for being ignited by said ignition system.

Such an ignition system generally comprises an initiator and an ignitor. By way of illustration, the initiator may consist:

in a pyrotechnic initiator triggered by mechanical or electrical action for generating hot gas on the surface of the ignitor; or in a non-pyrotechnic initiator triggered by mechanical or electrical action for generating a hot point on the surface of the ignitor: such as a hot wire, or a piezoelectric element.

The ignitor may in particular consist:

in a "microrocket" type pyrotechnic ignitor comprising a rapid combustion pyrotechnic charge arranged in a combustion chamber having a nozzle for delivering a jet that is directed to the surface of the charge (the composition of such a charge may for example be of the double base or Butalite® propellant type, and its weight is generally of the order of a few grams);

in an ignitor constituted by one or more fast reacting ignition pellets (e.g. of composition of the $B/KNO_3$ or $TiH_2/KClO_4$, or $NH_4ClO_4/NaNO_3$/binder type), arranged at the free surface of the pyrotechnic charge; and/or in an ignitor constituted by one or more solid propellant pellets (e.g. of composition of the basic copper nitrate type (BCN)/guanidine nitrate (GN) type).

It can be understood that during the ignition stage, the pyrotechnic ignitor also contributes to generating gas. It may be dimensioned so as to contribute in non-negligible manner to generating gas in addition to the gas generated by the pyrotechnic charge.

Figure 1B:
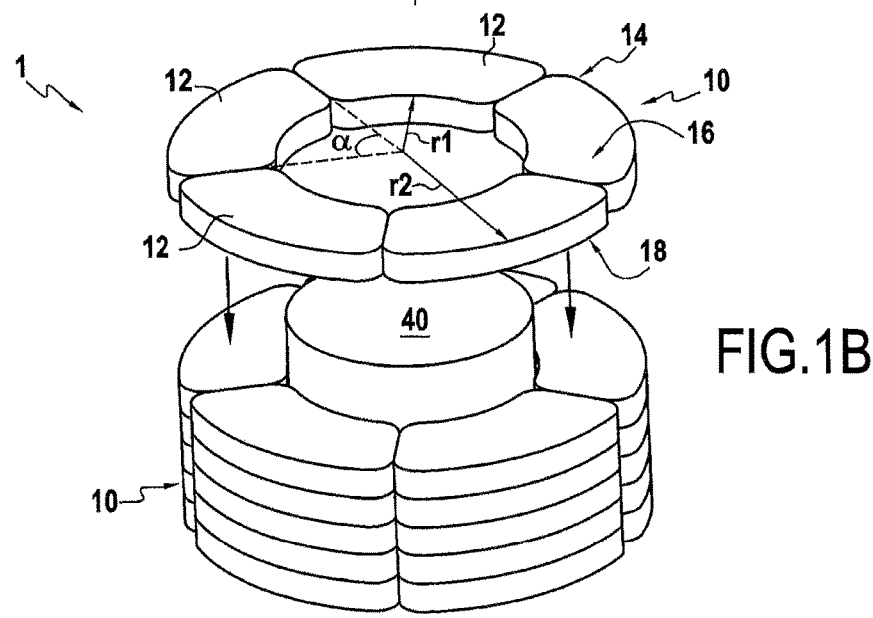
FIG. 1B shows the FIG. 1A pyrotechnic charge in greater detail.

As shown in FIG. 1B, the pyrotechnic charge 1 comprises a plurality of blocks 12 of pyrotechnic material, solid propellant in this example, that are stacked in layers 10 having the same constant thickness.

A layer 10 of the stack is constituted in this example of five distinct blocks 12 that, once assembled together, form a ring 14 extending around the axis A, having a circular inside section of inside diameter $2r1$ and a circular outside section of outside diameter $2r2$.

Since each block 12 in this example is identical, a block 12 extends over an angular sector of angle $\alpha$ equal to 360° divided by the number of angular sectors, giving 72° in this example. It should be observed that the number of blocks 12 making up the ring 14 may vary, but is generally equal to or greater than 3.

Each block 12 is axially defined by two parallel main faces 16, 18 that are spaced apart by a distance e corresponding to the thickness of a layer of the stack. The two faces 16, 18 of the block 12 are connected together by lateral faces that are orthogonal to the two faces 16, 18.

The section of the block 12 in a plane perpendicular to the axis of the charge is shown in FIG. 10. In this example, each block 12 thus has a radially outer face 20 in the form of a circular arc of radius of curvature r2, a radially inside face 22 in the form of a circular arc of radius of curvature r1, and two junction faces 24 and 26 interconnecting these outside and inside faces 20 and 22. In this example, it should be observed that the junction faces 24 and 26 are defined in planes containing the axis of the ring 14 of which the block 12 constitutes one angular sector. Nevertheless, in a variant embodiment, the junction walls 24 and 26 could have any shape suitable for co-operating with a complementary shape of a junction face of an adjacent block.

When the blocks 12 are assembled together to form the ring 14, two adjacent blocks 12 are in plane contact via the facing junction faces 24 and 26.

Figure 1C:
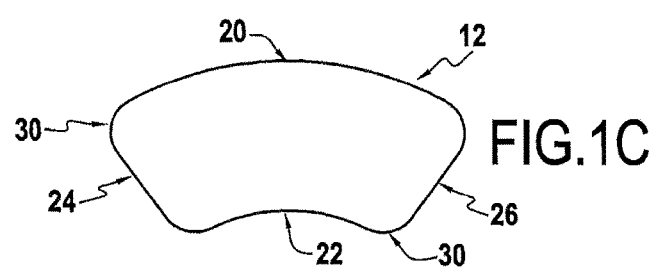
FIG. 1C is a plan view of a block forming part of the FIG. 1A charge.

In the example shown in FIGS. 1A, 1B, and 1C, each corner 30 defined between an inside or outside wall and an adjacent wall is truncated, and more particularly is rounded.

Furthermore, in this example, the pyrotechnic charge 1 includes, in addition to the above-described stack, a right cylindrical core forming a tube ignitor 40 inserted inside the stack and extending coaxially over the full height of the ring 14.

It can be understood from FIG. 1A that a ring 14 is dimensioned so that its outside face comes flush with the inside face of the combustion chamber 94. Preferably, no clearance is conserved between the inside face of the chamber and the outside face of the stack. In other words, the outside radius of the ring (which corresponds to the radius of curvature of the radially outside face of each block) is substantially equal to the inside radius of the generator body 91.

In like manner, no clearance is provided between the core 40 and the inside face of the stack.

The truncated edges of the blocks consequently serve to create gaps allowing gas to pass between the various layers of the charge. It is necessary for gas to pass in this way in order to transfer heat and thus to propagate combustion inside the charge.

From FIG. 1B, it can readily be understood that in order to improve the passage of gas, it is preferable for the gaps in the various superposed layers to be in alignment with one another in the axial direction so as to form continuous channels over the entire height of the stack. Preferably, the various layers of the stack thus present structures that are identical and the layers are superposed on one another in such a manner that the walls of the various blocks are in alignment in the axial direction.

Rounding some or all of the edges of the blocks constitutes merely one possible solution among others for allowing gas to pass in this way.

Figure 2A:
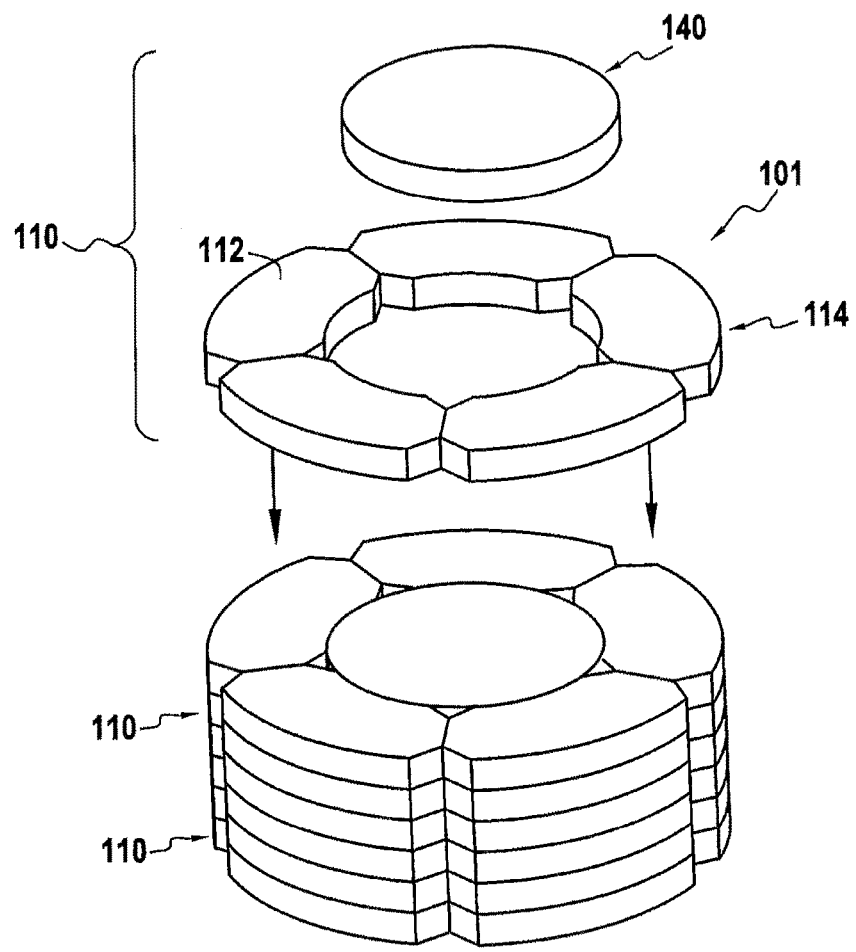
FIG. 2A shows a pyrotechnic charge in a second embodiment of the invention.

Thus, FIG. 2A shows a pyrotechnic charge 101 in a second embodiment of the invention. Elements that are similar or that present a similar function to elements of FIGS. 1A, 1B, and 1C are given the same numerical references in these figures, plus 100.

Figure 2B:
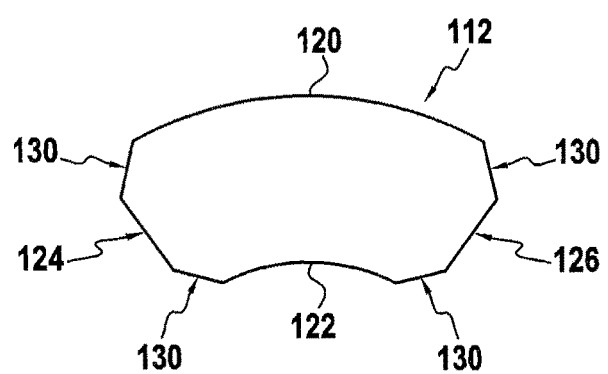
FIG. 2B shows a block of the FIG. 2A charge in greater detail.

In this second embodiment, and as can be seen more particularly in FIG. 2B, the pyrotechnic blocks forming the stack present corners 130 that are chamfered, not rounded.

Figure 2C:
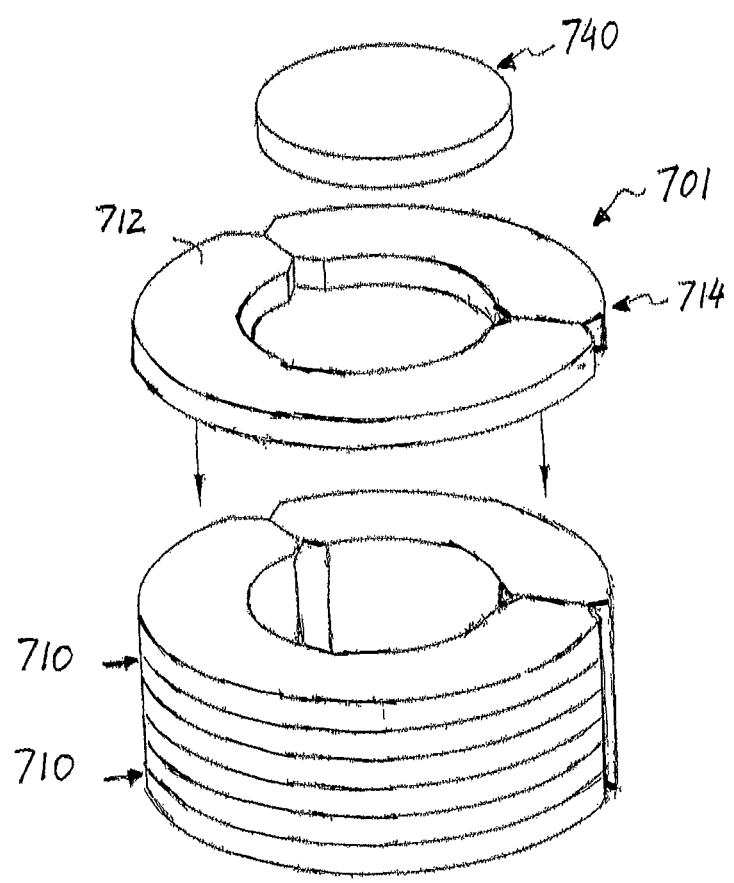
FIG. 2C shows a pyrotechnic charge in according to an embodiment of the invention.

FIG. 2C shows a pyrotechnic charge 701 according to an embodiment of the invention. FIG. 2C shows a configuration of a pyrotechnic charge 701 in which one layer 710 of the stack includes a central disk 740 and each layer 710 of the stack comprises two distinct blocks 712 that form an angular sector of a ring 714.

Furthermore, in order to omit the tube ignitor 40, each layer 110 of the stack in this embodiment contains a central disk 140 (see FIG. 2A) made of a pyrotechnic material that is identical to or different from that of the other blocks, in particular of propellant. The thickness of a central disk 140 is substantially equal to the distance of the ring 114 of the layer to which it belong, the disk 140 and the ring 114 being coaxial.

Furthermore, each central disk 140 is indirect contact with the ring and the layer to which it belongs. The radius of the disk 140 is substantially equal to the inside radius r1 of the ring.

Figure 3:
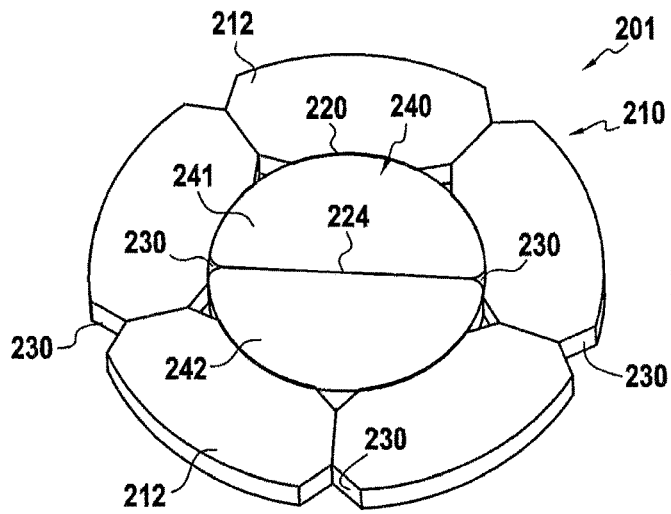
FIG. 3 shows a layer in a stack of layers forming a pyrotechnic charge in a third embodiment of the invention.

FIG. 3 shows a layer 210 of a pyrotechnic charge 201 in a third embodiment of the invention, in which the central disk 240 is made up of two distinct blocks 241 and 242, each occupying an angular sector of a disk.

Each central block 241, 242 in this example is in the shape of a half-disk defined by a radially outside wall 220 in the form of a circle of radius of curvature very slightly less than r1 (the inside radius of curvature of the ring) and a junction wall 224 that is substantially plane.

In the example shown, the corner formed between each end of the junction wall 224 and the radially outside wall 220 is rounded. It could naturally be chamfered or truncated in some other way.

Figure 4:
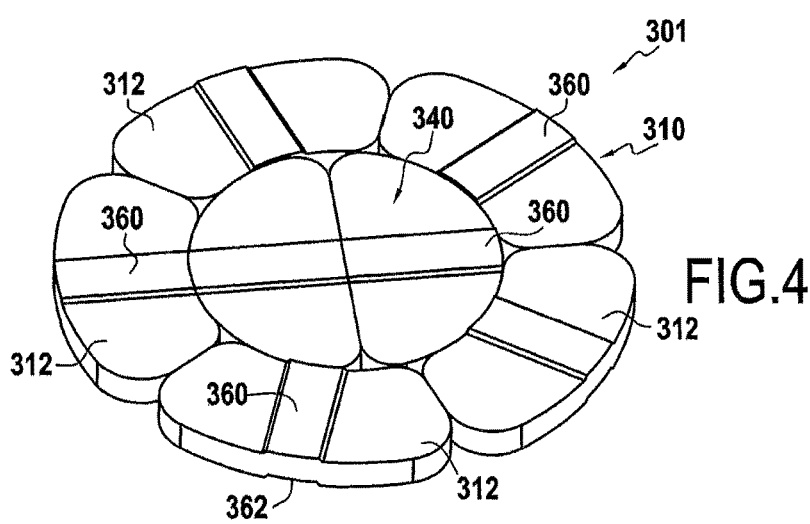
FIG. 4 shows a layer of a stack of layers forming a pyrotechnic charge in a fourth embodiment of the invention.

In order to allow gas to pass between the various layers of the stack, the blocks may present grooves and/or ribs in or on their main faces. FIG. 4 shows a layer 310 of a pyrotechnic charge 301 in a fourth embodiment of the invention. In this embodiment, each block has a rib 360 on one of its main faces and a groove 362 in its opposite main face, said groove 362 extending from one edge to an opposite edge of said face.

In the particular embodiment shown, both the groove 362 and the rib 360 of a given block are centered on an axial plane of symmetry of said block.

Naturally, and even this is not shown, a block could have more than one groove or more than rib arranged in any manner on its main faces.

Figure 5:
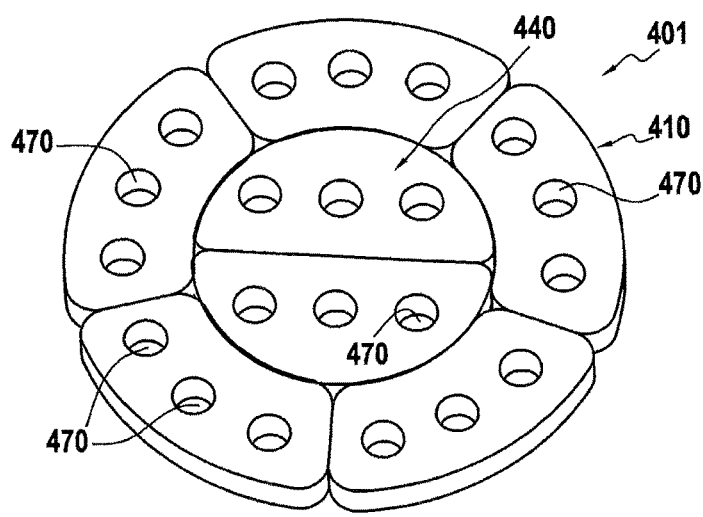
FIG. 5 shows a layer of a stack of layers forming a pyrotechnic charge in a fifth embodiment of the invention.

FIG. 5 shows a layer 410 of a pyrotechnic charge 401 in a fifth embodiment of the invention. In this embodiment, each unit block 412 is pierced by through holes 470 (three holes in this example) that perform two functions: firstly they form gas flow channels in addition to the gaps formed at the truncated corners of the blocks, and secondly they increase the combustion surface area. Naturally, the embodiment shown is not limiting, and in other embodiments, only some of the blocks need be pierced and/or the pierced blocks may present varying numbers of holes.

Figure 6:
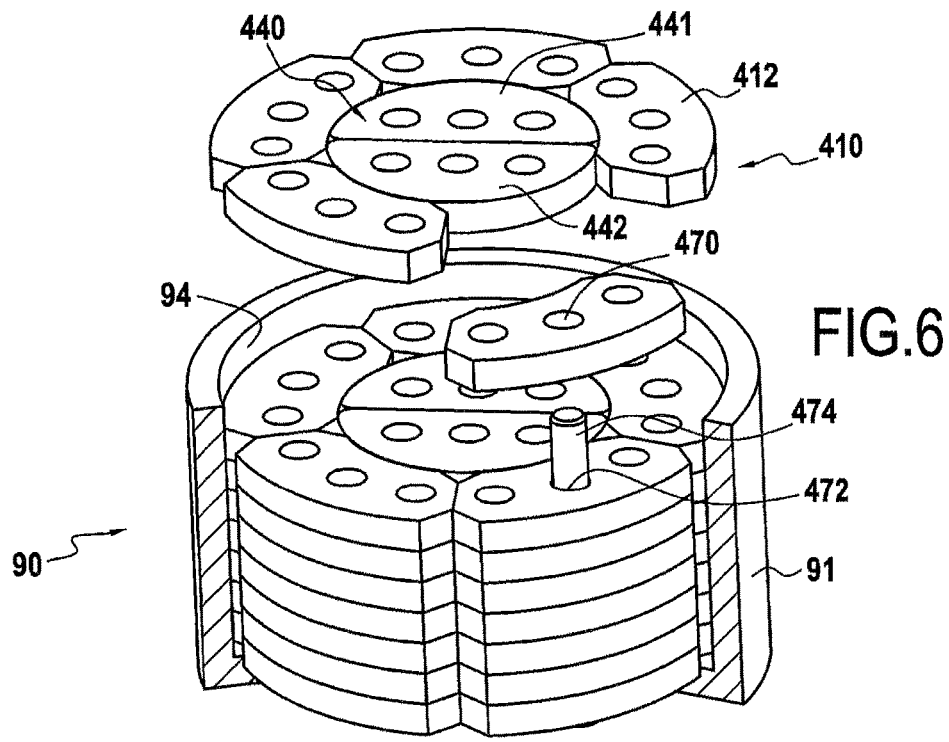
FIG. 6 shows means for positioning a pyrotechnic charge of the invention in a gas generator combustion chamber.

In an advantageous configuration shown in FIG. 6, each layer of the stack includes at least one "positioning" hole 470 and the positioning holes 470 in the various layers are placed in register with one another so as to form a channel 472 passing right through the stack in the axial direction. Under such circumstances, in order to put the charge 401 into place inside the combustion chamber 94, it is advantageous for the gas generator 90 to have a retaining pin 474 adapted to pass through the channel 472. The layers of the stack are thus held in a preferred position in which the holes and the gaps of the various layers are in register with one another. The retaining pin 474 may be conserved or removed after assembly.

Figure 7:
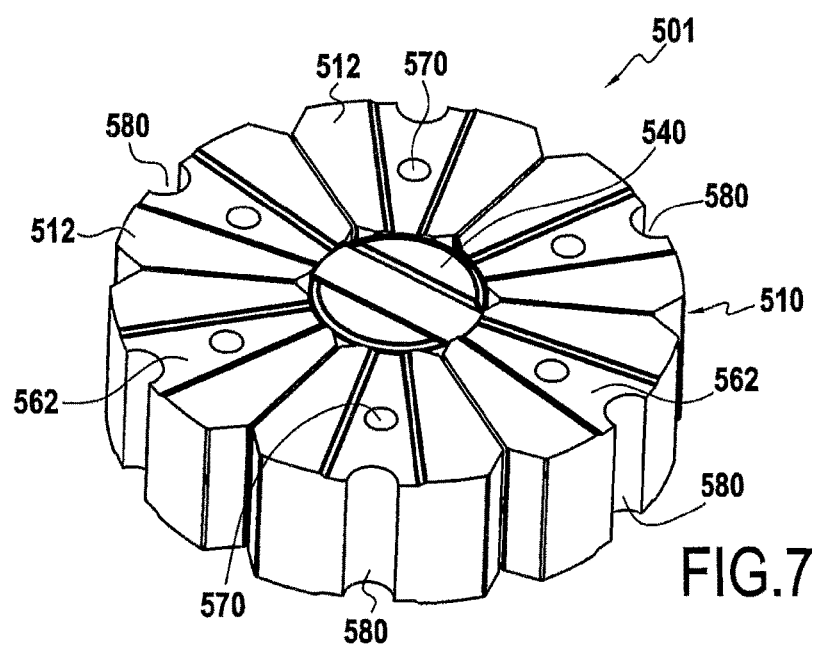
FIG. 7 shows a layer of a stack of layers forming a pyrotechnic charge in a sixth embodiment of the invention.

FIG. 7 shows a layer 510 of a pyrotechnic charge 501 in a sixth embodiment of the invention. In this example, in addition to the holes 570 and grooves 562, the blocks 512 present notches 580 in their outside walls. Just like the holes 570 and the grooves 562, the notches 580 serve to pass gas, and they also serve to increase the combustion area of the charge. Preferably, at least one block 512 of each stack layer making up the charge 501 includes a notch 580, and the layers are arranged relative to one another in such a manner that the notches 580 are in alignment in order to define a continuous groove 582 forming a passage for gas and passing right through the stack.

Figure 8:
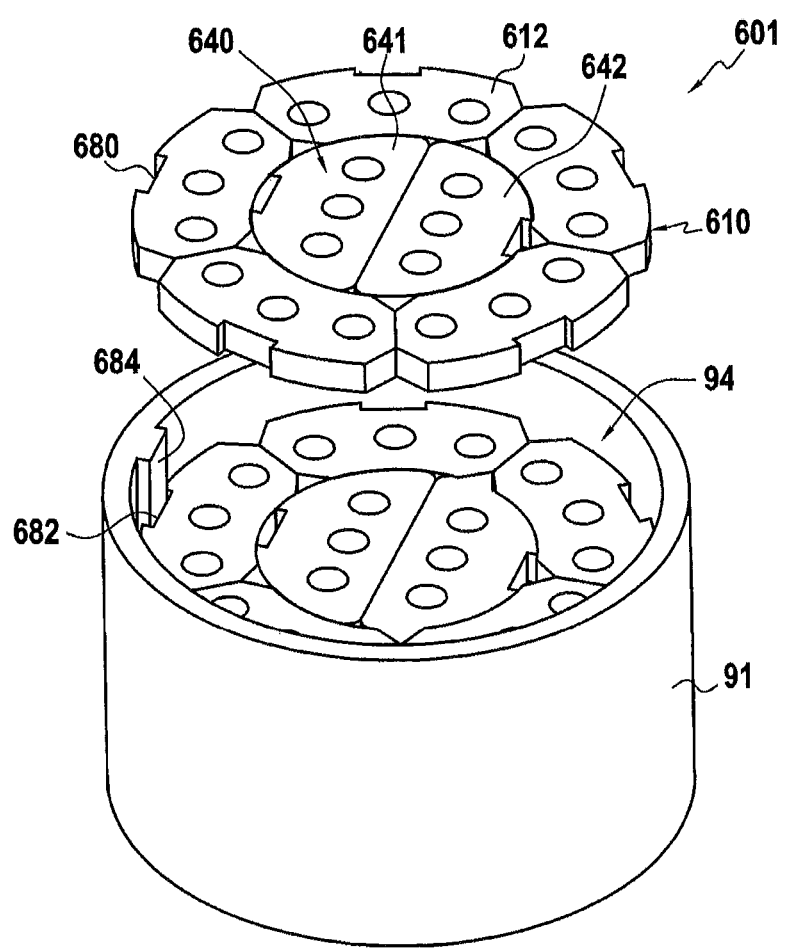
FIG. 8 shows other means for positioning a pyrotechnic charge of the invention inside a gas generator combustion chamber.

In an advantageous configuration that is shown in FIG. 8, the body 91 of the gas generator includes a positioning rib 684 on its inside fact that acts as keying means suitable for co-operating with a groove 682 formed by an alignment of notches 680 in the blocks 612 of the various layers in the stack, so as to ensure that the shaft 601 is properly positioned inside the combustion chamber 94.

The invention claimed is:

1. A pyrotechnic charge for a pyrotechnic gas generator, the pyrotechnic charge comprising a plurality of blocks made of pyrotechnic material stacked in a plurality of layers, each block being defined by two main faces that are substantially orthogonal to a stacking direction of the plurality of layers, wherein each layer of the stack comprises at least two distinct blocks of pyrotechnic material, each forming an angular sector of a ring, said at least two distinct blocks in each layer of the stack being assembled together to form the ring, wherein at least one layer of the stack includes a central disk of pyrotechnic material, and wherein the ring formed by the at least two distinct blocks of said at least one layer of the stack is coaxial about said central disk, and wherein a thickness of the central disk is substantially equal to that of the ring, and wherein each of the at least two distinct blocks has a shape that is different from the shape of the central disk.

2. A pyrotechnic charge according to claim 1, wherein at least one block of each layer presents at least one truncated corner.

3. A pyrotechnic charge according to claim 2, wherein the truncated corner is chamfered.

4. A pyrotechnic charge according to claim 1, wherein the central disk is formed by at least two distinct blocks, each forming an angular sector of a disk.

5. A pyrotechnic gas generator according to claim 1, wherein a radius of the central disk is substantially equal to an inside radius of the ring.

6. A pyrotechnic charge according to claim 1, wherein at least one block presents a rib on one of its main faces.

7. A pyrotechnic charge according to claim 1, wherein at least one block presents at least one groove formed in one of its main faces, said groove extending from one edge to an opposite edge of said face.

8. A pyrotechnic charge according to claim 1, wherein at least one block of the stack presents a notch in one of its lateral faces.

9. A pyrotechnic charge according to claim 8, wherein the notch is in a radially outside face.

10. A pyrotechnic charge according to claim 1, further comprising a plurality of said central disks of pyrotechnic material that are arranged in said plurality of layers so that, each layer of said plurality of layers of the stack includes one of said plurality of said a central disks of pyrotechnic material wherein, in each layer of the stack, a thickness of the central disk is substantially equal to that of the ring.

11. A pyrotechnic gas generator comprising a body housing a pyrotechnic charge according to claim 1, and an ignition system configured to initiate combustion of said charge.

12. A pyrotechnic gas generator according to claim 11, wherein each layer of the stack comprises a ring formed by assembling together at least two distinct blocks each forming an angular sector of a ring, the body presenting the shape of a right cylinder, and an outside radius of the ring is substantially equal to an inside radius of the body.

13. A gas generator according to claim 11, wherein at least one block of each layer of the stack constituting the charge includes an opening, said opening being in alignment with an opening of a block of each other layer of the stack so as to form a channel extending right through the stack, and wherein the body includes positioning means adapted to co-operate with said channel.

14. A gas generator according to claim 13, wherein the opening is a notch formed in one of the side faces of the block, said notch being in alignment with a notch in a block of each other layer of the stack, thereby forming a channel extending from end to end of the stack, and the positioning means comprise a positioning rib formed on the inside face of the body.

15. A gas generator according to claim 13, wherein the opening is a positioning hole passing right through the block, opening out into its two main faces, said positioning hole being in alignment with a positioning hole in a block of each other layer of the stack so as to form a channel passing right through the stack, and the positioning means comprise a retaining pin adapted to pass through said channel so as to hold the layers of the stack in position.

* * * * *